(12) United States Patent
Bodum

(10) Patent No.: US 8,807,824 B2
(45) Date of Patent: Aug. 19, 2014

(54) MILK FROTHING APPARATUS HAVING IMPROVED FROTHING EFFECT

(75) Inventor: Jorgen Bodum, Meggen (CH)

(73) Assignee: Pi-Sesign AG, Triengen (CH)

( * ) Notice: Subject to any disclaimer, the term of this patent is extended or adjusted under 35 U.S.C. 154(b) by 1143 days.

(21) Appl. No.: 12/741,173

(22) PCT Filed: Oct. 2, 2008

(86) PCT No.: PCT/CH2008/000409
§ 371 (c)(1),
(2), (4) Date: May 3, 2010

(87) PCT Pub. No.: WO2009/059439
PCT Pub. Date: May 14, 2009

(65) Prior Publication Data
US 2010/0260005 A1    Oct. 14, 2010

(30) Foreign Application Priority Data

Nov. 5, 2007    (CH) .................................... 1716/07
Dec. 10, 2007    (CH) .................................... 1907/07

(51) Int. Cl.
*B01F 11/00*    (2006.01)
*B01F 13/08*    (2006.01)
*B01F 15/06*    (2006.01)

(52) U.S. Cl.
USPC ............ 366/277; 366/243; 366/273; 366/144

(58) Field of Classification Search
CPC ... B01F 7/0025; B01F 11/0085; A47J 43/105
USPC ......... 366/332, 289, 285, 286, 278, 277, 331, 366/243, 256, 273, 144; 99/452; 426/519
See application file for complete search history.

(56) References Cited

U.S. PATENT DOCUMENTS 597,502 A * 1/1898 Lahmer ......................... 366/333
6,095,676 A * 8/2000 Kuan ............................. 366/256

(Continued)

FOREIGN PATENT DOCUMENTS

| CA | 2310180 A1 | 11/2001 |
| WO | 2006050900 A1 | 5/2006 |
| WO | 2008/049246 A2 | 5/2008 |

OTHER PUBLICATIONS

International Design Registration No. DM/069 770.

(Continued)

*Primary Examiner* — Tony G Soohoo
*Assistant Examiner* — Anshu Bhatia
(74) *Attorney, Agent, or Firm* — Sughrue Mion, PLLC

(57) ABSTRACT

An apparatus for frothing a liquid food product is disclosed. It comprises a drive unit (1) and a frothing unit (3). The frothing unit (3) comprises a guide rod (30), which is configured along at least one section as a threaded rod (31). A frothing element (40) is in threaded engagement with the guide rod (30) and can thus be moved along a helical path on the guide rod (30). At least one dog (36, 36') is driven by the drive unit (1) in a circular motion about the longitudinal axis of the guide rod (30) and in the process entrains the frothing element (40) such that said element is driven to perform a helical motion on the guide rod (30). In this way, the frothing element can perform an up and down motion superimposed on the rotational motion thereof along the longitudinal direction.

15 Claims, 5 Drawing Sheets

(56) References Cited

U.S. PATENT DOCUMENTS

| | | | |
|---|---|---|---|
| 6,283,625 B2 * | 9/2001 | Frankel et al. | ................ 366/146 |
| 6,558,035 B2 | 5/2003 | Lane | |
| D476,523 S | 7/2003 | Bodum | |
| D607,690 S | 1/2010 | Bodum | |

2003/0177914 A1    9/2003  Schub

OTHER PUBLICATIONS

English translation of the IPRP and Written Opinion of the International Searching Authority.

* cited by examiner

MILK FROTHING APPARATUS HAVING IMPROVED FROTHING EFFECT

TECHNICAL FIELD

The present invention relates to an apparatus for frothing a liquid food product. Since apparatuses of this type are usually used to froth milk, the apparatus is also called a milk frothing apparatus for the sake of simplicity in the text which follows.

PRIOR ART

The prior art discloses battery-operated milk frothing apparatuses which have a drive unit which contains one or more batteries and an electric motor. A long shaft which is connected to the motor and comprises a solid wire extends axially downward from the drive part. A frothing element is mounted on the lower end of the shaft. The frothing element may, in particular, be in the form of a toroidal coil which extends perpendicular to the shaft around the longitudinal direction defined by the shaft and is guided on an annular wire holder. Milk frothing apparatuses of this type are disclosed, for example, in US-A-2003/0177914 or U.S. Pat. No. 6,558,035. Types of frothing elements other than a toroidal coil are also known. For example, US design No. 476,523 discloses a milk frothing apparatus with a frothing element which has a conical shape which widens to a great extent at the bottom, with ripples being formed in the surface of the frothing element at the base of the cone.

Milk frothing apparatuses of this type produce froth by introducing air into the milk and finely dividing the air bubbles produced as a result. This creates a mixture of milk and small finely distributed air bubbles which is stabilized by the properties of the milk to form a froth. It is important here for the milk frothing apparatus to actually be able to introduce air into the milk. In the case of known milk frothing apparatuses, the user has to periodically move the frothing element to and fro between the base of the vessel and the surface of the milk in the vessel for this purpose, in order to ensure firstly that the frothing element actually introduces air at the surface of the milk, and secondly that the air bubbles are sufficiently broken up throughout the vessel. If, in contrast, the user were to hold the frothing element only in the region of the base of the vessel, the milk would possibly be stirred but only a little or no froth would be produced.

This is disadvantageous particularly when the milk frothing apparatus is not designed to be handheld but is intended to be mounted on a vessel in a stationary manner. In this case, it is not readily possible for the frothing element to move to and fro between the base of the vessel and the surface of the milk during operation.

WO 2006/050900 discloses a milk frothing apparatus of which the frothing element is magnetically driven. The frothing element is arranged on the base of a vessel which can be heated from below, and the height of said frothing element cannot be changed.

DESCRIPTION OF THE INVENTION

It is an object of the present invention to provide an apparatus for frothing a liquid food product, in particular milk, which allows the frothing element to move through different regions of the liquid to be frothed.

This and other objects are achieved by an apparatus for frothing a liquid food product comprising a drive unit and a frothing unit. The frothing unit has a guide rod which extends, by way of its longitudinal axis, along a longitudinal direction and which has at least one portion which is in the form of a threaded rod. This guide rod is adapted to be fixed in position in relation to the drive unit. A frothing element is mounted on the guide rod, said frothing element being in threaded engagement with the guide rod and it thus being possible for said frothing element to be moved along a helical path on the guide rod. In order to drive the frothing element, at least one driver is provided, said driver being adapted to be driven with a circular movement about the longitudinal axis of the guide rod by the drive unit, and said driver extending between the drive unit and the frothing element in such a way that the frothing element can be driven with a helical movement on the guide rod by the circular movement of the driver.

Therefore, in the case of this apparatus, when the frothing element is driven, said frothing element executes not only a rotary movement as in the prior art, but also moves on a helical path along the longitudinal axis of the stationary guide rod. In this case, the circumferential speed of the frothing element about the longitudinal axis is considerably higher than its translatory speed in the longitudinal direction, preferably at least by a factor of 10, and therefore the frothing effect can be produced, in principle, in a similar way to in the prior art. However, in addition, the frothing element moves up or down along the direction of rotation. As a result, the frothing element thoroughly mixes different regions of the liquid to be frothed, as a result of which the frothing effect is decisively improved.

The direction of rotation of the frothing element is preferably automatically periodically reversed. To this end, the drive unit has an electric motor and a control unit which is designed to automatically periodically reverse the direction of rotation of the motor or to reverse the direction of rotation of the motor in accordance with another predetermined scheme, in order to thus attain an upward and downward movement of the frothing element along the helical path. To this end, the control unit may, for example, be designed to reverse the direction of rotation of the motor after a predetermined number of revolutions of said motor, and can have corresponding movement sensors (for example so-called encoders), as are known from the prior art, to determine the number of revolutions covered. As an alternative, the control unit can also be designed to detect the position of the frothing element by, for example, monitoring the motor current. If the motor current increases to a great extent, this is an indication that the frothing element has reached an end of the threaded region of the guide rod and a further movement of the frothing element in the current direction is no longer possible. The control unit can then be designed to reverse the direction of rotation of the motor when the motor current increases. It goes without saying that a large number of other embodiments for automatically reversing the direction are possible.

In a simple and advantageous embodiment, the driver is in the form of a driver rod which extends substantially parallel to the longitudinal axis of the guide rod and at a predetermined distance from said guide rod. This driver rod is connected to the frothing element in such a way that said frothing element can be displaced along the longitudinal direction in relation to the driver rod. Two driver rods are preferably provided, said driver rods being arranged on diametrically opposite sides of the guide rod in relation to the longitudinal axis. However, it goes without saying that more than two driver rods, which are preferably uniformly distributed around the guide rod, can be provided.

In order to keep the driver rod at a predetermined distance from the guide rod, the driver rod can be connected, at its end which is remote from the drive unit (called the distal end in the text which follows), to a distal bearing element which is rotatably mounted on the guide rod. In this way, the distal end of the driver rod can be fixed to the guide rod in a manner guided on a circular path.

The frothing element is preferably designed in a similar way to that already known from battery-operated milk frothing apparatuses from the prior art. The frothing element can comprise, in particular, a toroidally bent coil or helical spring which is arranged so as to surround the longitudinal axis of the guide rod and is connected to a support element which is in threaded engagement with the guide rod. The support element can then comprise at least one axial passage opening through which the driver can extend such that it can be displaced in the longitudinal direction. A refinement of this type is advantageous particularly when the driver or drivers is/are in the form of driver rods. In particular, an annular wire holder or retaining ring which surrounds the longitudinal axis of the guide rod can run in the interior of the wire coil. The support element then preferably comprises a guide nut which is in threaded engagement with the guide rod and is connected to the retaining ring by means of at least one retaining web. The retaining web will then preferably have at least one axial passage opening through which the driver extends such that it can be displaced in the longitudinal direction. However, it goes without saying that other types of connection of the frothing element to the guide rod are also feasible, and the frothing element can also be designed other than with a toroidally bent helical spring.

In order to prevent the frothing element jamming if the frothing element reaches one of the ends of the thread of the guide rod, the guide rod can have a relieve groove or recess (that is to say a region with a smaller outside diameter than that of the threaded rod) in at least one region which adjoins a portion which is in the form of a threaded rod, said recess allowing the frothing element to rotate freely in the region of the recess without executing a helical movement in the process.

In order to ensure that the frothing element in the region of a recess comes back into threaded engagement with the threaded rod after the movement of the drive has been reversed, the apparatus can have an elastic element in order to exert a force on the frothing element in the direction of that portion of the guide rod which is in the form of a threaded rod when the frothing element is in the region of the recess. In a simple embodiment, the elastic element may be designed as a helical spring with a plurality of turns which extend around the guide rod.

In an advantageous embodiment, the driver, at its end which faces the drive unit (which is called the proximal end in the text which follows), is rigidly connected to a gear wheel. Said gear wheel is rotatably mounted on the guide rod and is adapted to engage with a drive gear wheel which, in turn, can be directly or indirectly driven by the motor so as to rotate. However, other ways of transmitting force from the motor to the driver are feasible, for example by means of a frictional connection, a drive belt etc., or by means of magnetic transmission of force, as described in greater detail in the text which follows.

The frothing unit is preferably designed to be mechanically connected to the drive unit and to be removed from said drive unit. To this end, the frothing unit can be retained directly on the drive unit, for example by means of a rotationally fixed plug-type connection between the housing of the drive unit and the guide rod. However, it is also feasible for the frothing unit to be retained by another part of the apparatus and only for means for transmitting force between the drive unit and the frothing unit to be provided.

According to an advantageous embodiment, torque is transmitted between the drive unit and the frothing unit in a magnetic manner, that is to say the drive unit and the frothing unit interact in such a way that a torque can be transmitted from the drive unit to the driver of the frothing unit on account of a magnetic effect. To this end, the drive unit can have an electric motor and a first magnetic transmission element having at least one permanent magnet which can be driven with a rotary movement about the longitudinal axis of the guide rod by the electric motor. However, other means for generating a rotating magnetic field, for example a coil arrangement which generates a rotating magnetic field by a current which varies over time, are also feasible. Coil arrangements of this kind are well known from the field of brushless electric motors. Moving elements in the base unit can be largely avoided in this way. The frothing unit preferably comprises a (second) magnetic transmission element having at least one permanent magnet which is arranged such that it can rotate about the longitudinal axis of the guide rod and is connected to the driver of the frothing unit.

The permanent magnet or magnets are arranged in the respective transmission element in such a way that the magnetic field generated by the transmission element is variable along a circumferential direction (in other words, is variable with the rotation angle about the longitudinal axis, that is to say is not cylindrically symmetrical).

In an advantageous refinement, the apparatus is designed as a stationary device. Said apparatus comprises a vessel, which is open at the top, for accommodating the liquid food product to be frothed, wherein the vessel has a base and a circumferential side wall. The drive unit is arranged beneath the base of the vessel, for example in a base unit which either holds the vessel or itself forms the vessel. The frothing unit extends into the vessel from above. Magnetic transmission of torque is particularly advantageous specifically in a milk frothing apparatus of this type since it is possible to dispense with the need to mechanically feed a shaft through said milk frothing apparatus and to dispense with corresponding sealing measures. An arrangement of this type is particularly advantageous even when the frothing unit is designed in a completely different way to that described above.

The apparatus can comprise a cover which is designed to be arranged on the vessel in such a way that the cover at least partially covers the vessel from above. The cover can be removable or be directly or indirectly connected to the drive unit such that it can move, for example be mounted on, in particular connected in an articulated manner to, the base unit. The frothing unit is then preferably attached to the cover, in particular attached such that it can be removed.

In this case, the first magnetic transmission element is preferably arranged beneath the base of the vessel, and the second magnetic transmission element is correspondingly arranged in a proximal and region of the frothing unit, said end region being adjacent to the base of the vessel during operation of the apparatus.

In order to heat the liquid in the apparatus before frothing and/or during frothing, the apparatus preferably comprises at least one heating element which is suitable for heating the base of the vessel. In this case, said heating element may be, for example, a heating element produced using thick-film technology which is attached directly to the lower face of the base, a sheathed heating element, an infrared heater, an inductive heater or a combination of the above.

In order to facilitate cleaning of the apparatus, an insert can be provided, the shape of said insert corresponding substantially to the inner shape of the vessel and said insert being inserted into the vessel such that it can be removed. The insert is preferably flexible, and therefore it can be matched to the inner shape of the vessel and can fit snugly against the vessel wall. The insert can be composed, in particular, of silicone rubber or a similar food-safe, flexible material which is easy to clean.

BRIEF DESCRIPTION OF THE DRAWINGS

Preferred embodiments of the invention are described in the text which follows with reference to the drawings, in which.

DETAILED DESCRIPTION OF PREFERRED EMBODIMENTS

Figure 1:
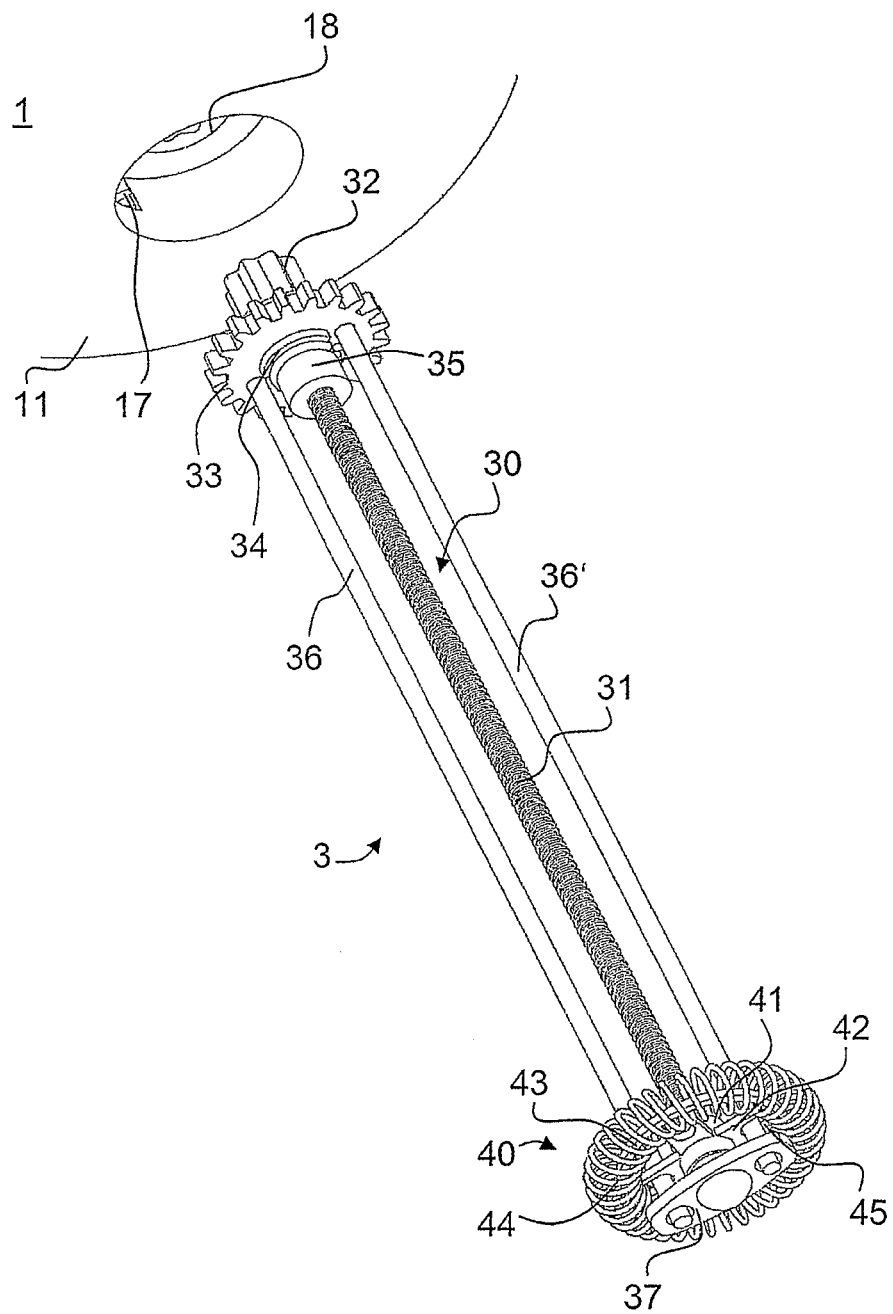
FIG. 1 shows a perspective partial view of a milk frothing apparatus according to a first embodiment of the present invention.
Figure 2:
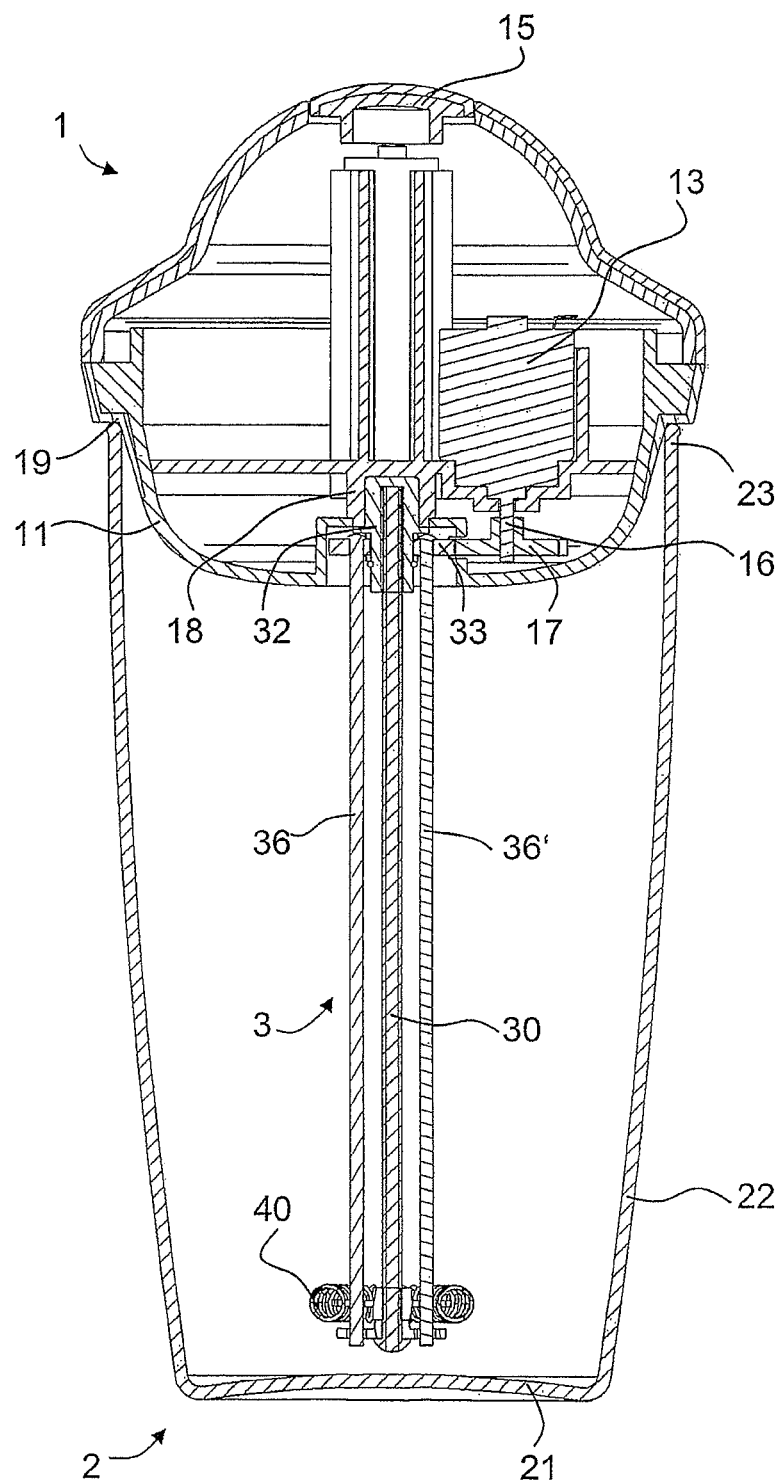
FIG. 2 shows a schematic longitudinal section through the milk frothing apparatus of FIG. 1 in a central plane which runs through the driver rods of the frothing unit.
Figure 3:
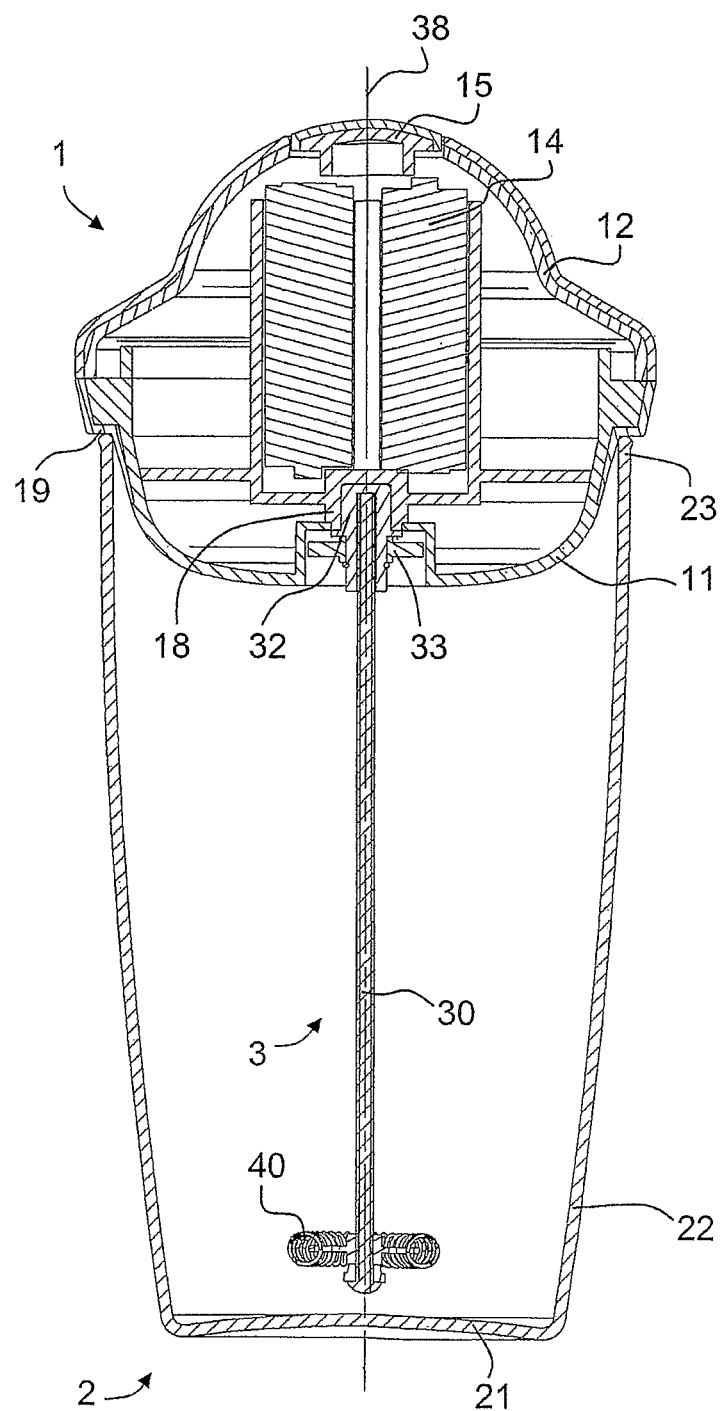
FIG. 3 shows a schematic longitudinal section through a plane which is rotated through 90° about the longitudinal axis in relation to the sectional plane of FIG. 2.

FIGS. 1 to 3 illustrate a first exemplary embodiment of a milk frothing apparatus according to the invention. The milk frothing apparatus comprises a drive unit 1 which rests, by way of an annular resting surface 19 of its housing lower part 11, on the upper edge 23 of a vessel 2 with a base 21 and a circumferential side wall 22. A removable frothing unit extends out of the drive unit 1 and vertically downward into the vessel 2.

The drive unit 1 has a battery compartment for two standard AA-size batteries 14. Furthermore, an electric motor 13 and a control unit (not illustrated in the drawing) are accommodated in the drive unit. At the top, the drive unit is closed by a housing upper part 12, a pressure switch 15 (which is only schematically indicated) being arranged on the upper face of said housing upper part. The control unit and the motor 13 can be switched on and switched off by the pressure switch 15. The housing lower part 11 adjoins an accommodation bushing 18, which is open at the bottom, for the upper end of the frothing unit 3.

The frothing unit 3 comprises a central guide rod 30 which defines a central longitudinal axis 38 (cf. FIG. 3) and has, over the majority of its length, a threaded region 31 with an external thread which is in the form of a fine thread. The guide rod 30 has, at its proximal end which faces the drive unit 1, a thickened portion 32 which has a polygonal-star-shaped cross section and can be inserted into the correspondingly complementarily shaped accommodation bushing 18 of the drive unit. In a bearing region 35 which adjoins the bottom of the thickened portion 32, a gear wheel 33 is rotatably mounted on the guide rod 30 and is axially fixed by a clamping ring 34. The ends of two driver rods 36, 36' are accommodated in the gear wheel 33 in a manner radially offset in relation to the longitudinal axis, said driver rods extending downward at a distance from and parallel to the guide rod on diametrically opposite sides of the guide rod. The driver rods are retained at their distal ends in a distal bearing element 37 which, like the gear wheel 33, is mounted such that it can rotate but is axially fixed on the central guide rod 30. In this way, the driver rods 36, 36' execute a circular movement about the central longitudinal axis of the guide rod 30 when the gear wheel 33 is driven to rotate about the guide rod.

A frothing element 40 is in threaded engagement with the threaded region 31 of the guide rod 30. The frothing element 40 comprises a support element in the form of a central guide nut 41 which is in smooth threaded engagement with the guide rod 30. Four retaining webs 42 extend radially outward from this guide nut in a manner distributed uniformly around the circumference. These retaining webs are connected to a retaining ring 43, the central ring axis of said retaining ring coinciding with the longitudinal axis of the guide rod 30, the retaining ring thus extending around the longitudinal axis. A toroidal wire coil 44 is retained on the retaining ring 43, as is known from milk frothing apparatuses from the prior art. The retaining webs 42 have axially running passage openings 45. The two driver rods 36, 36' extend through the passage openings in two diametrically opposite retaining webs. The dimensions are chosen such that the frothing element 40 can be longitudinally displaced in the axial direction in relation to the driver rods.

In order to start operation, the frothing unit 3 is connected to the drive unit 1 by being inserted, by way of the thickened portion 32 of the guide rod 30, into the bushing 18. As a result, the guide rod is secured in a manner fixed in terms of rotation and displacement in relation to the housing, and the gear wheel 33 of the frothing unit, which gear wheel is rotatably mounted on the guide rod, engages with a drive gear wheel 17 of the drive unit, which drive gear wheel is arranged in a radially offset manner. The drive gear wheel 17 is mounted directly on the shaft 16 of the electric drive motor 13; however, a gear mechanism may also be interposed. The milk frothing apparatus is switched on by pressing the pressure switch 15. The drive motor 13 starts, in a manner controlled by the control unit, to rotate the drive gear wheel 17. Said drive gear wheel transmits the rotary movement to the gear wheel 33 of the frothing unit. As a result, the driver rods 36 are made to move in a circular manner about the central guide rod. In the event of this circular movement, said driver rods carry along the frothing element 40 which, as a result, executes a helical movement on the threaded region 31 of the guide rod 30.

After a predetermined number of revolutions, the control unit changes the direction of rotation of the motor 13, for example by reversing the polarity of the supply voltage to the motor. As a result, the frothing element 40 now executes a helical movement in the opposite direction, until it arrives back at the starting position. Periodically switching over the direction of rotation of the motor thus produces a periodic upward and downward movement, which is superimposed by a rapid rotary movement, of the frothing element 40 along the guide rod 30. In this case, the circumferential speed of the frothing element in the direction of rotation is considerably greater than the axial speed along the longitudinal axis.

Instead of being designed to change the direction of rotation of the motor after a predetermined number of revolutions, the control unit can also be designed such that it identifies, for example due to an increase in current in the motor, when the frothing element has arrived at the upper end of the threaded region 31 and cannot rotate any further, and then reverses the direction of rotation of the motor. It is also feasible to provide a setting device on the drive unit, it being possible for said setting device to set the axial movement range of the frothing element as a function of the quantity of milk in the vessel 2, and said setting device thus being used to determine how many revolutions of the motor or of the frothing element have to be performed before the direction of rotation is reversed. A large number of further variations in the control system are also possible. It is also feasible for the user to manually reverse the direction of rotation, for example by pressing a corresponding button.

In the present example, the frothing unit 3 is directly connected to the drive unit 1 by being inserted into said drive unit. It goes without saying that other types of connection are also possible, for example a screw-in connection or snap-in connection. The drive unit does not necessarily have to be designed to rest on a vessel, but can, for example, also be designed to be handheld.

Figure 4:
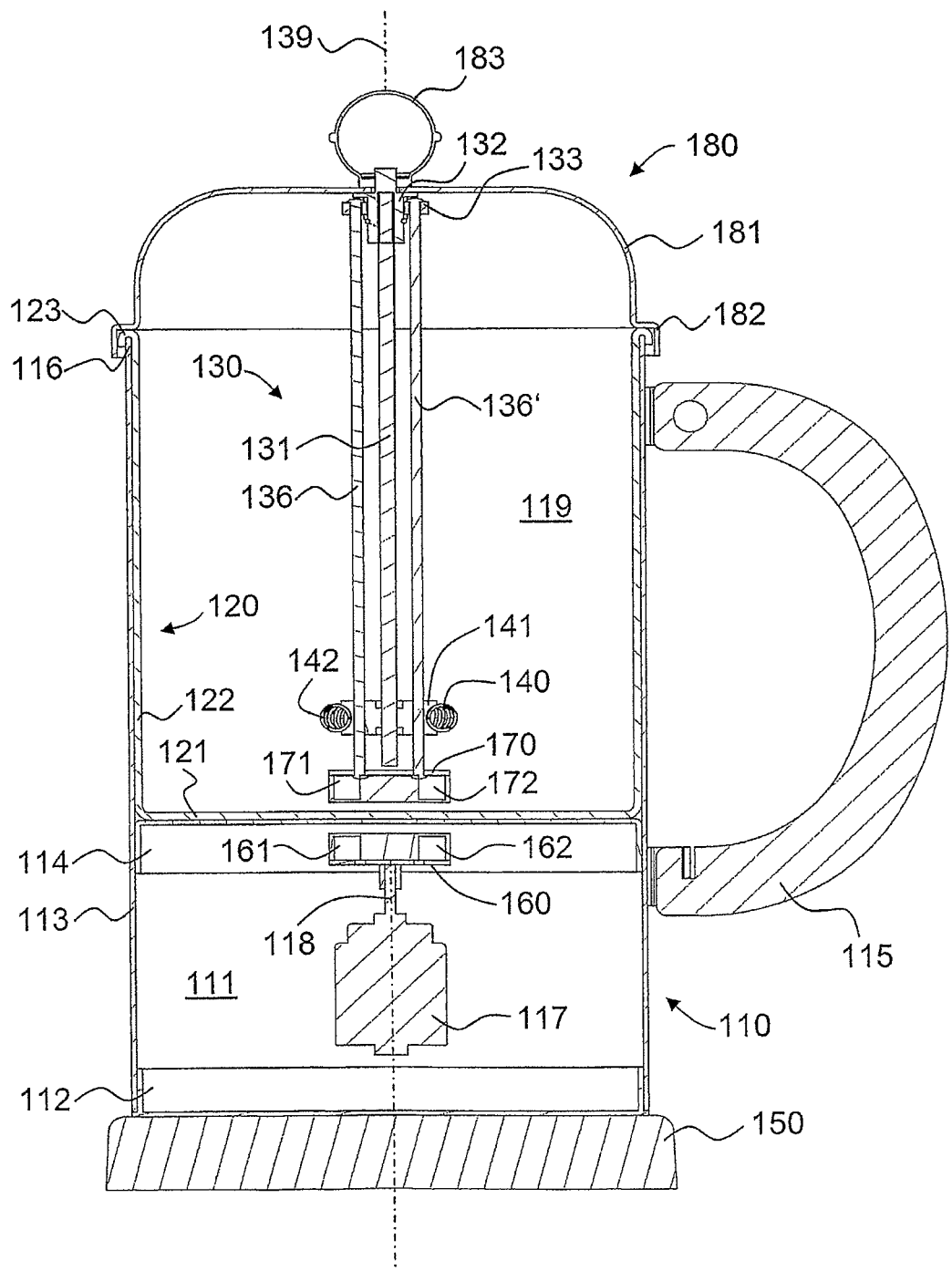
FIG. 4 shows a schematic central longitudinal section through a milk frothing apparatus according to a second embodiment.
Figure 5:
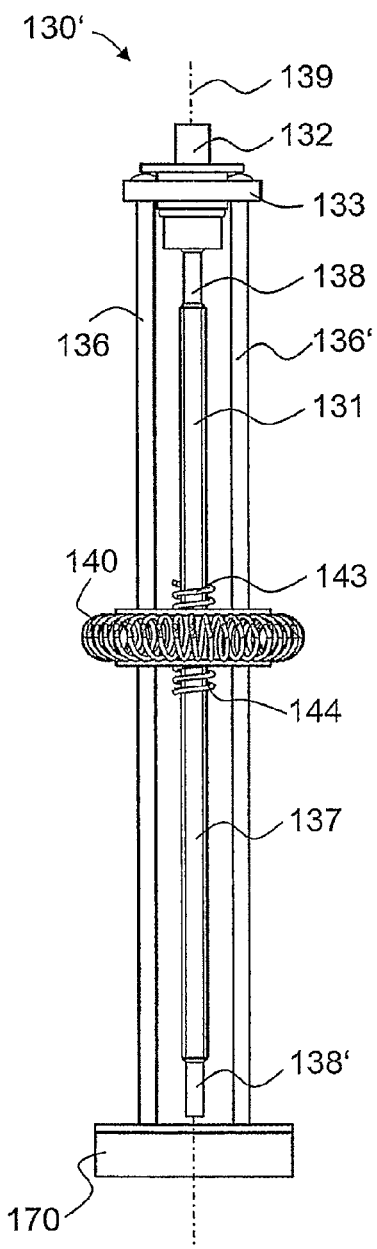
FIG. 5 shows a schematic side view of a frothing unit according to a variant of the second embodiment.
Figure 6:
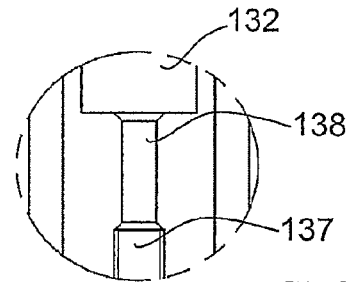
FIGS. 6-8 show enlarged details from FIG. 5.
Figure 7:
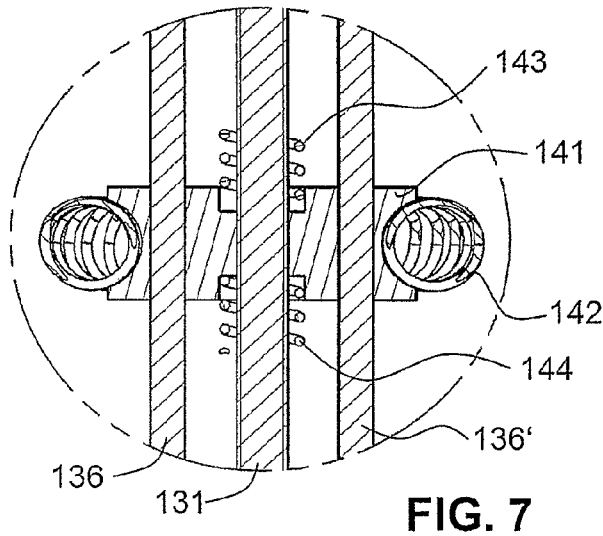
Figure 8:
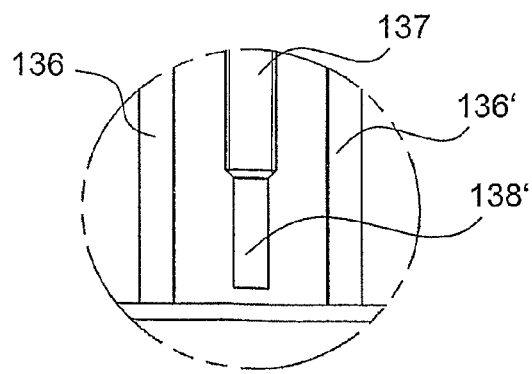

A second exemplary embodiment of a milk frothing apparatus according to the invention is illustrated in FIG. 4. In this embodiment, the milk frothing apparatus comprises a base 150, onto which a base unit 110 is mounted in a removable manner. An electrical connection line (not illustrated in the drawing) for connection to a conventional domestic electrical power supply system is connected to the base 150. The base further comprises an electrical contact element (likewise not illustrated in the drawing) in order to establish an electrical connection with the base unit 110. A complementary contact element is correspondingly formed in said base unit. Such pairs of contact elements are well known from the prior art and are used there in particular for kettles.

The base unit 110 forms a vessel 119 which has a circular-cylindrical basic shape with a vessel base 114 and a circumferential side wall 113. A drive unit 111, which is illustrated in a highly schematic manner in FIG. 4, is located beneath the vessel base, said drive unit likewise being bounded by the continuous side wall 113 at the sides. The drive unit comprises a control unit (not illustrated in the drawing), operator control elements (likewise not illustrated in the drawing), for example in the form of an on/off switch, and an electric motor 117. A first magnetic transmission element 160 is mounted on the motor shaft 118 of the motor 117; said transmission element will be discussed in greater detail in the text which follows. At least one heating element, for example in the form of a customary encapsulated heating element or in the form of a thick-film heater which is mounted directly on the base 114, is also located on the lower face of the base 114. Heating elements of this type are known from the prior art.

A cup-like insert 120 which is open at the top and is composed of silicone rubber is inserted into the vessel 119, said insert also being called a silicone insert in the text which follows. In terms of shape and size, the silicone insert is designed such that, from the inside, it rests flat on the base 114 of the vessel 119 by way of its base 121, and bears against the side wall 113 of the vessel 119 by way of its circumferential side wall 122. The upper rim 123 is inverted toward the outside and engages over the upper edge of the vessel 119 which is formed by the upper rim 116 of the vessel side wall. The silicone insert 120 is securely held in the vessel 119 in this way. Said insert can be removed from the vessel easily and without the use of tools for cleaning purposes. On account of its high resistance to heat and cleaning agents and on account of its dirt-repelling surface properties, the silicone insert can be easily cleaned under running water or in a dishwasher. The insert is preferably composed of a natural-colored silicone rubber with a Shore A hardness of, for example, 70, but said insert can also be produced from another rubber-like, food-safe material with similar properties to silicone rubber.

A cover 180 rests on the upper rim of the silicone insert, said cover having a curved top wall 181 and a circumferential rim region 182 which forms an annular resting surface for resting on the rim of the silicone insert. A stud or knob 183 is mounted centrally on the cover, said stud or knob being open toward the lower face of the cover. This stud serves as a receptacle for attaching a frothing unit 130. To this end, the frothing unit 130 has, at its upper end, an upper bearing element 132 which projects into the stud by way of its upper end region and is held there by a frictional connection or a releasable latching connection.

The frothing unit is basically of similar construction to the frothing unit of the first exemplary embodiment. It comprises a central guide rod 131 in the form of a threaded rod which, by way of its upper end, is anchored in the bearing element 132. The guide rod defines a central longitudinal axis 139. A support wheel is rotatably mounted on the bearing element 132 and is held there by a clamping ring such that it is axially fixed in terms of displacement. Two driver rods 136, 136' are held, by way of their upper ends, in the carrier wheel 133 and extend at a distance and parallel to the guide rod on diametrically opposite sides of the guide rod. At their lower ends, the driver rods are connected to an upper transmission element 170 which will be explained in greater detail in the text which follows. In this way, the distance between the driver rods is fixed both at the upper end and at the lower end, and the driver rods can execute a circular movement about the central guide rod.

A frothing element 140 runs on the guide rod. Said frothing element comprises a support 141 which has an internal thread which engages smoothly with the external thread of the guide rod, and also has a toroidally bent, helical wire coil 142, as is known from milk frothing apparatuses from the prior art. The support has two diametrically opposite, axial passage openings through which the two driver rods 136, 136' extend such that they can be easily axially displaced.

In the event of a circular movement of the driver rods, said driver rods carry along the frothing element 140 which accordingly executes a helical movement on the guide rod 131.

The motor 117 of the drive unit 111 generates a rotary drive movement during operation, said rotary drive movement being transmitted to the frothing unit by the interacting magnetic transmission elements 160, 170. To this end, each of the transmission elements 160, 170 contains at least one permanent magnet, preferably at least two permanent magnets which are distributed over the circumference. This magnet or these magnets are arranged in such a way that the north pole and south pole of the magnet or magnets alternate along the circumferential direction (that is to say along a circle around the longitudinal axis of the motor shaft). In other words, each of the transmission elements generates a magnetic field which has alternately opposite poles along the circumferential direction, or, expressed generally, a magnetic field which is not cylindrically symmetrical around the longitudinal axis.

In the event of rotation of the first (lower) transmission element 160, magnetic forces act between the two transmission elements, these magnetic forces causing the second (upper) transmission element 170 to also be carried along and rotate. In this way, the rotary movement of the motor shaft 118 is transmitted to the frothing unit 130 and there causes a circular movement of the driver rods 136, 136' and therefore ultimately a helical movement of the frothing element 140.

The magnets of the transmission elements 160 and 170 used can, in principle, be ferrite magnets. However, permanent magnets with a higher coercive field strength or a higher energy product are preferably used, for example permanent magnets based on a neodymium/iron/boron alloy (NdFeB), in particular $Nd_2Fe_{14}B$. Magnets of this type are well known from the prior art. Said magnets can be produced by powder metallurgy or can be plastic-bound. In order to protect the magnets against corrosive influences, said magnets can be coated with a protective layer and/or encapsulated with a plastic. Encapsulation of this type is expedient particularly for the upper transmission element 170, since this transmission element comes into contact with the milk. In order to improve the electromagnetic compatibility (EMC) and, in particular, to prevent disturbances in the motor and other electrical devices, the region of the magnets, in particular in the base unit, can be magnetically shielded, for example by a soft-magnetic encapsulation of the region to the side of and beneath the lower transmission element.

The rotating transmission element 160 therefore generates a rotating, non-rotationally symmetrical magnetic field which generates a torque on the transmission element 170 to be driven and thus carries along said transmission element by virtue of magnetic interactions. A driving magnetic field of this type can be generated in other ways besides by rotating permanent magnets, for example by a coil arrangement which generates a rotating magnetic field by currents which vary over time. Coil arrangements of this type are well known from the field of brushless electric motors. Moving elements in the base unit can be largely avoided in this way.

In order to disturb the magnetic fields between the transmission elements as little as possible, the vessel base 114 is preferably produced from an only weakly magnetic or non-magnetic material, for example non-magnetic stainless steel.

The transmission elements preferably have a diameter of approximately 15 to 30 mm. The axial distance between the magnets in the transmission elements is preferably approximately 5 to 15 mm.

The magnetic transmission of torque between the drive unit and the frothing unit allows the vessel 119 to be shaped largely as desired. In contrast to the prior art, no passage openings for the drive elements or the like are required in the vessel base, and corresponding sealing can be dispensed with. Since the frothing unit is retained on the cover, any structures for fixing or guiding the frothing element on the vessel base or on the vessel wall can also be dispensed with. In particular, it is therefore possible to design the vessel base and the vessel wall to be completely smooth, without pin-like projections, as are known from the prior art in conjunction with magnet-driven milk frothing apparatuses.

In turn, this allows the shape of the silicone insert 120 to be chosen to be as simple as possible, here a simple, cup-like shape without any projections in the base. Such a shape permits particularly easy cleaning and handling and good heat transfer from the heating element, through the insert, to the liquid to be frothed.

During operation, the silicone insert 120 is first inserted into the vessel 119 with the cover 180 removed. The liquid to be frothed, in particular milk, is then filled into the silicone insert. In particular, the inherent weight of the milk presses the base 121 of the insert 122 flat against the base 114 of the vessel 119, and therefore good heat transfer from the heating element to the milk is ensured. The cover 180, with the frothing unit 130 inserted into it, is now put into position, and the device is switched on. In this manner, power is supplied to the heating element, and therefore said heating element begins to heat up the milk. At the same time, the motor 117 is made to rotate, in order to periodically move the frothing element 140 upward and downward on its helical path and thus to stir the milk during the heating process and finally to beat it to form a froth. After a predetermined time or when a predetermined temperature is reached, the supply of power to the heating element is interrupted. As soon as the milk is completely frothed, the motor 117 is also stopped. The cover 180, with the frothing unit retained therein, is now removed, and the frothed milk can be served by the base unit 110 being removed from the base 150.

For cleaning purposes, the frothing unit is firstly removed from the cover and cleaned under running water. Secondly, the silicone insert is removed from the vessel 119 and likewise cleaned under running water or in a dishwasher. Separate cleaning of the base unit, together with its sensitive electrical and mechanical components, can generally be dispensed with since all the parts which come into contact with the milk can be easily removed from the base unit.

The motor 117 is preferably controlled during the heating process and during the frothing process in the same way as in the first exemplary embodiment which is described above. In particular, provision may be made for the control unit to in each case change the direction of rotation of the motor 117 after a predetermined number of revolutions, for example by periodically reversing the polarity of the supply voltage to the motor. As a result, the frothing element 140 executes a periodic upward and downward movement, superimposed by a rapid rotary movement. In this case, the circumferential speed of the frothing element in the direction of rotation is again considerably greater than the axial speed along the longitudinal axis.

Instead of being designed to change the direction of rotation of the motor after a predetermined number of revolutions, the control unit can be designed, also in this exemplary embodiment, such that it identifies, for example due to an increase in current in the motor, when the frothing element has arrived at the upper end of the threaded region of the guide rod 131 and cannot rotate any further, and then reverses the direction of rotation of the motor. It is also feasible to provide a setting device on the drive unit, it being possible for said setting device to be used to set the axial movement range of the frothing element as a function of the quantity of milk in the vessel 2, said setting device thus being used to determine how many revolutions of the motor or of the frothing element have to be performed before the direction of rotation is reversed. It goes without saying that a large number of further variations in the control system are possible. It is also feasible for the user to manually reverse the direction of rotation, for example by pressing a corresponding button.

A variant of the frothing unit of the second exemplary embodiment is illustrated in FIGS. 5 to 8. In this variant, the guide rod 131 has two recesses 138, 138', that is to say regions with an outside diameter which is reduced compared to the threaded region 137. When the frothing element 140 enters the region of one of these recesses, said frothing element disengages from the threaded region 137 and can rotate freely. This prevents the frothing element 140 from jamming on the guide rod if the direction of rotation of the motor is not reversed in good time before the frothing element reaches the end of the movement region on the threaded rod. In order to ensure that the frothing element reengages with the threaded rod after the movement of the motor has been reversed, that is to say "finds" the thread again, two elastic elements in the form of short helical springs 143, 144 which are wound around the guide rod are provided, said helical springs pushing the frothing element in the direction of the threaded region 137 of the guide rod 131 when the frothing element is in the region of one of the recesses 138, 138'. Whereas these helical springs are connected to the frothing element 140 and are retained in central blind holes in the support 141 in the present example, the springs can also be freely displaceable on the guide rod or be connected to the guide rod or to an element which does not move in relation to the guide rod. Types of elastic elements other than helical springs are also feasible.

LIST OF REFERENCE SYMBOLS

1 Drive unit
11 Housing lower part
12 Housing upper part
13 Motor
14 Battery
15 Pressure switch
16 Motor shaft
17 Drive gear wheel
18 Accommodation bushing
19 Resting surface
2 Vessel
21 Base
22 Side wall
23 Upper edge
3 Frothing unit
30 Guide rod
31 Threaded region
32 Thickened portion
33 Gear wheel
34 Clamping ring
35 Bearing region
36, 36' Driver rod
37 Distal bearing element
38 Longitudinal axis
40 Frothing element
41 Guide nut
42 Retaining web
43 Retaining ring
44 Helical spring
45 Passage opening
110 Base unit
111 Lower part/drive unit
112 Base
113 Side wall
114 Separating wall/vessel base
115 Handle
116 Upper side wall region
117 Motor
118 Motor shaft
119 Vessel
120 Silicone insert
121 Base
122 Side wall
123 Upper rim region
130 Frothing unit
131 Threaded rod
132 Upper bearing element
133 Support wheel
136, 136' Driver rod
137 Upper recess
138 Lower recess
140 Frothing element
141 Support
142 Helical spring
143 Upper stop spring
144 Lower stop spring
150 Base
160 Magnet unit
161, 162 Magnet pole
170 Magnet unit
171, 172 Magnet pole
180 Cover
181 Top wall
182 Rim region
183 Cover stud/knob

The invention claimed is:

1. An apparatus for frothing a liquid food product, comprising a drive unit and a frothing unit which interacts with said drive unit, the frothing unit comprising:
   a guide rod having a longitudinal axis extending along a longitudinal direction, the guide rod having at least one threaded portion;
   a frothing element which is in threaded engagement with the threaded portion of the guide rod, so as to be movable along a helical path relative to the guide rod; and
   at least one driver adapted to be driven by the drive unit to carry out a circular movement about the longitudinal axis of the guide rod and arranged to drive the frothing element to carry out a helical movement relative to the guide rod,
   wherein the driver is in the form of a driver rod which extends substantially parallel to the longitudinal axis of the guide rod and which is connected to the frothing element to allow relative displacement of the frothing element and the driver along the longitudinal direction.

2. The apparatus as claimed in claim 1, wherein the drive unit comprises an electric motor and a control unit to periodically reverse the direction of rotation of the motor in order to attain a periodic upward and downward movement of the frothing element along the helical path.

3. The apparatus as claimed in claim 1, wherein two driver rods are provided, said driver rods being arranged on diametrically opposite sides of the guide rod in relation to the longitudinal axis.

4. The apparatus as claimed in claim 1, wherein the driver rod, at its distal end which is remote from the drive unit, is connected to a distal bearing element which is rotatably guided on the guide rod.

5. An apparatus for frothing a liquid food product, comprising a drive unit and a frothing unit which interacts with said drive unit, the frothing unit comprising:
   a guide rod having a longitudinal axis extending along a longitudinal direction, the guide rod having at least one threaded portion;
   a frothing element which is in threaded engagement with the threaded portion of the guide rod, so as to be movable along a helical path relative to the guide rod; and
   at least one driver adapted to be driven by the drive unit to carry out a circular movement about the longitudinal axis of the guide rod and arranged to drive the frothing element to carry out a helical movement relative to the guide rod,
   wherein the frothing element comprises a toroidally bent helical spring which is arranged so as to surround the longitudinal axis of the guide rod and is connected to a support element which is in threaded engagement with the guide rod.

6. An apparatus for frothing a liquid food product, comprising a drive unit and a frothing unit which interacts with said drive unit, the frothing unit comprising:
   a guide rod having a longitudinal axis extending along a longitudinal direction, the guide rod having at least one threaded portion;
   a frothing element which is in threaded engagement with the threaded portion of the guide rod, so as to be movable along a helical path relative to the guide rod; and
   at least one driver adapted to be driven by the drive unit to carry out a circular movement about the longitudinal axis of the guide rod and arranged to drive the frothing element to carry out a helical movement relative to the guide rod, wherein the guide rod has a recess in at least one region which adjoins said at least one threaded portion, said recess allowing the frothing element to rotate freely in the region of the recess without executing a helical movement.

7. The apparatus as claimed in claim 6, comprising at least one elastic element for exerting a force on the frothing element in the direction of said at least one threaded portion of the guide rod when the frothing element is in the region of the recess.

8. The apparatus as claimed in claim 7, wherein the elastic element comprises a helical spring with a plurality of turns which extend around the guide rod.

9. The apparatus as claimed in claim 1, wherein the driver, at its proximal end which faces the drive unit, is rigidly connected to a gear wheel which is rotatably mounted on the guide rod and which is adapted to engage with a drive gear wheel which can be driven by the motor.

10. The apparatus as claimed in claim 1, wherein the drive unit comprises means for generating a rotating magnetic field, and wherein the frothing unit comprises a magnetic transmission element having at least one permanent magnet, the magnetic transmission element being arranged rotatably about the longitudinal axis of the guide rod and being connected to the driver of the frothing unit, the rotating magnetic field generating a torque on the magnetic transmission element by magnetic interactions wherein the drive unit and the frothing unit interact in such a way that a torque is exerted by the drive unit on the driver of the frothing unit on account of a magnetic effect.

11. The apparatus as claimed in claim 10, wherein the drive unit comprises an electric motor and a first magnetic transmission element having at least one permanent magnet, said first magnetic transmission element being driven by the electric motor for rotary movement about the longitudinal axis of the guide rod, and wherein the frothing unit comprises a second magnetic transmission element having at least one permanent magnet which is arranged rotatably about the longitudinal axis of the guide rod and is connected to the driver of the frothing unit, the first magnetic transmission element and the second magnetic transmission element interacting via magnetic forces.

12. The apparatus as claimed in claim 10, comprising a vessel, which is open at the top, for accommodating the liquid food product to be frothed, wherein the vessel has a base and a circumferential side wall, wherein the drive unit is arranged beneath the base of the vessel, and wherein the frothing unit extends into the vessel from above.

13. The apparatus as claimed in claim 12, which comprises a cover which is designed to be arranged on the vessel in such a way that the cover at least partially covers the vessel from above, and wherein the frothing unit is attached to the cover.

14. The apparatus as claimed in claim 12, which comprises at least one heating element which is suitable for heating the base of the vessel.

15. The apparatus as claimed in claim 12, which has a flexible insert which is inserted into the vessel such that it can be removed.

\* \* \* \* \*